US009095824B2

(12) United States Patent
Tada et al.

(10) Patent No.: US 9,095,824 B2
(45) Date of Patent: **\*Aug. 4, 2015**

(54) VINYLIDENE FLUORIDE RESIN POROUS FILM AND MANUFACTURING METHOD THEREFOR

(75) Inventors: Yasuhiro Tada, Tokyo (JP); Takeo Takahashi, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 947 days.

This patent is subject to a terminal disclaimer.

(21) Appl. No.: 13/148,099

(22) PCT Filed: Feb. 2, 2010

(86) PCT No.: PCT/JP2010/051425
§ 371 (c)(1),
(2), (4) Date: Aug. 5, 2011

(87) PCT Pub. No.: WO2010/090183
PCT Pub. Date: Aug. 12, 2010

(65) Prior Publication Data
US 2011/0290716 A1    Dec. 1, 2011

(30) Foreign Application Priority Data

Feb. 5, 2009  (JP) ................................. 2009-024754
Jun. 1, 2009  (JP) ................................. 2009-132273

(51) Int. Cl.

| B01D 71/34 | (2006.01) |
|---|---|
| B01D 69/08 | (2006.01) |
| B01D 67/00 | (2006.01) |
| C02F 1/44 | (2006.01) |
| D01F 6/48 | (2006.01) |
| D01F 1/10 | (2006.01) |
| D01D 5/24 | (2006.01) |

(52) U.S. Cl.
CPC .............. B01D 71/34 (2013.01); B01D 67/002 (2013.01); B01D 67/0027 (2013.01); B01D 69/08 (2013.01); C02F 1/444 (2013.01); D01D 5/24 (2013.01); D01F 1/10 (2013.01); D01F 6/48 (2013.01); B01D 2323/20 (2013.01); B01D 2325/02 (2013.01); B01D 2325/022 (2013.01); B01D 2325/34 (2013.01)

(58) Field of Classification Search
CPC ...... B01D 69/08; B01D 67/002; B01D 71/34; B01D 2323/20; B01D 2325/022; B01D 67/0027; B01D 2325/02; B01D 2325/34; C02F 1/444; D01F 6/48; D01F 1/10; D01D 5/24

USPC ................ 210/488, 489, 490, 500.23, 500.42
See application file for complete search history.

(56) References Cited

U.S. PATENT DOCUMENTS

| 5,472,607 | A | * | 12/1995 | Mailvaganam et al. ....... 210/490 |
| 5,834,107 | A | * | 11/1998 | Wang et al. ................. 428/310.5 |
| 6,110,309 | A | * | 8/2000 | Wang et al. ...................... 156/77 |
| 2008/0156722 | A1 | * | 7/2008 | Suzuki et al. ............ 210/500.36 |

FOREIGN PATENT DOCUMENTS

| CN | 1213339 | 4/1999 |
|---|---|---|
| CN | 101227967 | 7/2008 |
| JP | 03-215535 | 9/1991 |
| JP | 07-173323 | 7/1995 |
| JP | 63-296939 | 12/1998 |
| JP | 63-296940 | 12/1998 |
| JP | 2001-87636 | 4/2001 |
| JP | 2007-313491 | 12/2007 |
| JP | 2009-226338 | 10/2009 |
| WO | 01/28667 | 4/2001 |
| WO | 02/070115 | 9/2002 |
| WO | 2005/099879 | 10/2005 |
| WO | 2007/010832 | 1/2007 |
| WO | 2008/117740 | 10/2008 |
| WO | 2010/082437 | 7/2010 |

OTHER PUBLICATIONS

International Search Report issued May 18, 2010 in corresponding International Application No. PCT/JP2010/051425.
International Preliminary Report on Patentability (in English) together with Written Opinion issued Sep. 13, 2011 in International (PCT) Application No. PCT/JP2010/051425.

* cited by examiner

*Primary Examiner* — John Kim
(74) *Attorney, Agent, or Firm* — Wenderoth, Lind & Ponack, L.L.P.

(57) ABSTRACT

A porous membrane of vinylidene fluoride resin, having two major surfaces, including a dense layer which governs filtration performance on one major surface side and a sparse layer which contributes to reinforcement on the other opposite major surface side, and having an asymmetrical gradient network texture including pore sizes which increase continuously from the one major surface to the other opposite major surface, wherein the dense layer includes a 7 μm-thick portion contiguous to the one major surface showing a porosity A1 of at least 50%, and the one major surface shows a pore size of at most 0.30 μm. The vinylidene-fluoride-resin porous membrane is useful as a porous membrane for separation and particularly exhibits good water-permeation-rate retentivity even in continuous filtration of cloudy water.

20 Claims, 2 Drawing Sheets

VINYLIDENE FLUORIDE RESIN POROUS FILM AND MANUFACTURING METHOD THEREFOR

TECHNICAL FIELD

The present invention relates to a porous membrane made of a vinylidene fluoride resin, which is suitable as a membrane for separation and particularly excellent in water (filtration) treatment performance, and a process for production thereof.

BACKGROUND ART

Vinylidene fluoride resin is excellent in chemical resistance, heat resistance and mechanical strength and, therefore, has been studied with respect to application thereof to porous membranes for separation. Many proposals have been made regarding porous membranes of vinylidene fluoride resin, for water (filtration) treatment, particularly for production of potable water or sewage treatment, and also processes for production thereof (e.g., Patent documents 1-6 listed below).

Also, the present inventors, et al., have found that a process of melt-extruding a vinylidene fluoride resin having a specific molecular weight characteristic together with a plasticizer and a good solvent for the vinylidene fluoride resin into a hollow fiber-form and then removing the plasticizer by extraction to render the hollow fiber porous is effective for formation of a porous membrane of vinylidene fluoride resin having minute pores of appropriate size and distribution and also excellent in mechanical strength, and have made a series of proposals (Patent documents 7-10 and others). However, a strong demand exists for further improvements of overall performances including filtration performances and mechanical performances of the porous membrane necessary for use as a filtration membrane. For example, as an MF (microfiltration) membrane used for the purpose of, e.g., production of potable water or industrial water by clarification of river water, etc., or clarification of sewage, it is required to have an average pore size of at most 0.25 μM for secure removal of Cryptosporidium as a typical injurious microorganism, and causes little contamination (clogging) with organic substances on the occasion of continuous filtration operation of cloudy water, to maintain a high water permeation rate. From this viewpoint, a porous membrane proposed by Patent document 6 below has an excessively large average pore size, and a hollow-fiber porous membrane proposed by Patent document 8 retains a problem in maintenance of a water permeation rate in continuous filtration operation of cloudy water.

[Patent document 1] JP-A 63-296939
[Patent document 2] JP-A 63-296940
[Patent document 3] JP-A 3-215535
[Patent document 4] JP-A 7-173323
[Patent document 5] WO01/28667A
[Patent document 6] WO02/070115A
[Patent document 7] WO2005/099879A
[Patent document 8] WO2007/010832A
[Patent document 9] WO2008/117740A
[Patent document 10] WO2010/082437A

DISCLOSURE OF INVENTION

An object of the present invention is to provide a porous membrane of vinylidene fluoride resin which has a surface pore size, a water permeation rate and mechanical strength, particularly suitable for separation and particularly for water (filtration) treatment, and also shows good water-permeation-rate maintenance performance, even when applied to continuous filtration of cloudy water, and also a process for production thereof.

Being provided for achieving the above-mentioned object, the porous membrane of vinylidene fluoride resin of the present invention, is a substantially single layer of vinylidene fluoride resin having two major surfaces sandwiching a certain thickness, and a pore size distribution including a dense layer which governs filtration performance on the one major surface side and a sparse layer which contributes to reinforcement on the other opposite major surface side, and having an asymmetrical gradient network texture including pore sizes which increase continuously from the one major surface to the other opposite major surface, wherein the dense layer includes a 7 μm-thick portion contiguous to the one major surface showing a porosity percentage A1 of at least 50%, and the one major surface shows a pore size of at most 0.30 μm. It is particularly suited as a water treatment membrane, wherein the one major surface is used as a surface in contact with water to be treated, and the other opposite major surface is used as a surface in contact with permeated water.

As a part of study for achievement of the above-mentioned object, the present inventors made a continuous filtration test (of which the details will be described later) by the MBR (membrane bioreactor) process (more specifically, an activated sludge process assisted by membrane separation) as a practical test for evaluating the performance in continuous filtration of cloudy water, with respect to various hollow-fiber porous membranes of vinylidene fluoride resin including those disclosed in the above-mentioned Patent documents 7-10. The evaluation was performed in terms of a critical filtration flux which is defined as a maximum filtration flux giving a differential pressure rise of at most 0.133 kPa after 2 hours of membrane filtration treatment as a practical evaluation standard of water-permeation-rate maintenance power, and investigated a correlation of the evaluation result with the pore size distributions on the outer and inner surfaces and porosity, etc., of the porous membranes. As a result, it has been found that, among the type of vinylidene-fluoride-resin porous membranes including a dense layer which governs filtration performance on the side of water to be treated and a sparse layer which contributes to reinforcement on the side of permeated water, and having an asymmetrical gradient network texture including pore sizes which increase continuously from the side of the water to be treated to the side of the permeated water, many porous membranes exhibiting lager critical filtration fluxes tend to have a smaller surface pore size on the side of the water to be treated and a larger porosity of dense layer contiguous to the side of water to be treated. As a result of further pursuing these apparently contradictory demands, the porous membrane of the present invention has been arrived at.

In order to realize the above-mentioned structural characteristics of the vinylidene-fluoride-resin porous membrane, it has been found very important to select a plasticizer forming the melt-kneaded composition before cooling by melt-kneading with a vinylidene fluoride resin is very important; more specifically preferred to use a relatively large amount of plasticize that has a mutual solubility with vinylidene fluoride resin under heating (at a melt-kneading composition-forming temperature) and provides the melt-kneaded composition with a crystallization temperature Tc' (° C.) which is almost equal to the crystallization temperature Tc (° C.) of the vinylidene-fluoride-resin alone, to carry out a melt-kneading with a vinylidene fluoride resin of high-molecular weight, and to cool the resultant film-like material from one side thereof, followed by cooling for solidification of the film and extraction of the plasticizer, to provide a porous membrane with an asymmetrical gradient-network-texture. From this viewpoint, it is undesirable either to use a small amount of plasticizer that lowers Tc of a vinylidene fluoride resin as shown in Patent document 4 or to use a plasticizer that lowers Tc of a vinylidene fluoride resin to form a porous membrane retaining spherulite structure as shown in Patent document 5. Moreover, it is undesirable to use a large amount of good solvent of a vinylidene fluoride resin that has been used in order to promote homogeneous mixing with film-starting-material resin and a plasticizer in Patent documents 7-10, etc. and has a mutual solubility with a cooling fluid, as it lowers the crystallization temperature of the melt-kneaded composition and causes a difficulty in control of a surface pore size.

The process for producing a porous membrane according to the present invention, comprises: melt-extruding a composition obtained by melt-kneading 20-50 wt. % of a vinylidene fluoride resin having a weight-average molecular weight of at least 300,000 and 50-80 wt. % of a plasticizer into a form of a film; cooling the film preferentially from one side thereof with a liquid inert to the vinylidene fluoride resin to solidify the film; and extracting the plasticizer to recover a porous membrane having an asymmetrical gradient-network-texture; wherein the plasticizer comprises a polyester plasticizer which is mutually soluble with the vinylidene fluoride resin at a temperature forming the melt-kneaded composition and provides the melt-kneaded composition with a crystallization temperature which is substantially identical to a crystallization temperature of the vinylidene fluoride resin alone.

The above-mentioned process for producing a vinylidene-fluoride-resin porous membrane of the present invention is classified as a production process of the vinylidene-fluoride-resin porous membrane by the temperature-induced phase separation method utilizing a difference in temperature between the high crystallization temperature of the melt-kneaded composition of a vinylidene fluoride resin and a polyester plasticizer, and the cooling temperature. In contrast thereto, (a) the film formation according to the non solvent-induced phase separation method of contacting a vinylidene-fluoride-resin solution with a liquid (generally a non-solvent for a vinylidene fluoride resin) to cause coagulation and solidification as disclosed in Patent documents 1 and 2, is accompanied with difficulties such that the resultant membrane is liable to have a film thereon and caused to have a dense layer which is thin and has a high resin density (i.e., a low porosity), due to slow intra-membrane diffusion (mass transfer) of the non-solvent. Moreover, (b) it has been confirmed that the method of extraction-removal of dispersed silica powder as disclosed in the above-mentioned Patent document 3 is accompanied with technical difficulty in uniformly dispersing the silica powder to the proximity of the membrane surface, thus failing to provide a vinylidene-fluoride-resin porous membrane including a dense layer having a small surface pore size on the side of water to be treated and a high porosity, as a characteristic of the present invention (Comparative Example 6).

BEST MODE FOR PRACTICING THE INVENTION

Figure 1:
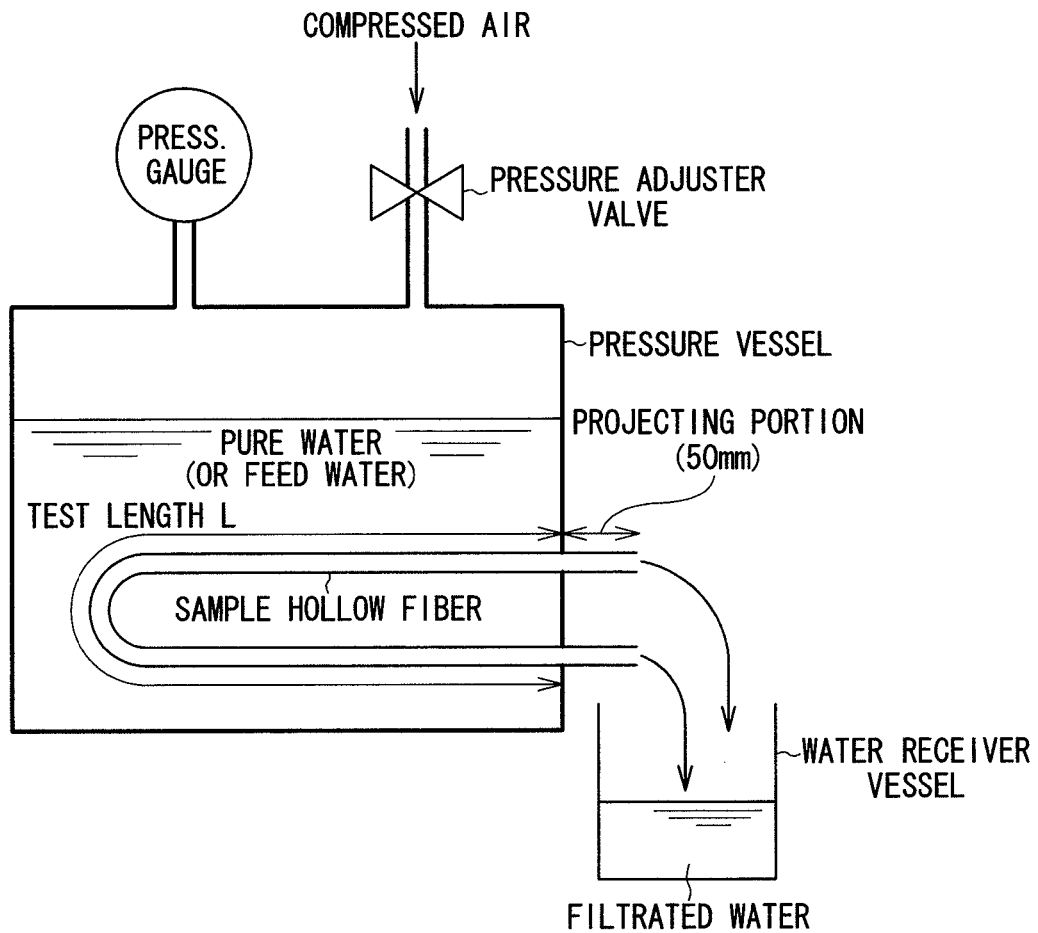
FIG. 1 is a schematic illustration of an apparatus for evaluating water permeability of hollow-fiber porous membranes obtained in Examples and Comparative Examples.

The porous membrane of the present invention can be formed in either a planar membrane or a hollow-fiber membrane, but may preferably be formed in a hollow-fiber membrane which can enlarge the membrane area per unit volume of filtration apparatus, particularly water filtration treatment.

Hereafter, the porous membrane of vinylidene fluoride resin, principally in a hollow-fiber form, of the present invention will be described in the order of the production process of the present invention which is a preferred process for production thereof.

(Vinylidene Fluoride Resin)

The vinylidene fluoride resin used as a principal starting material of the membrane in the present invention may be homopolymer of vinylidene fluoride, i.e., polyvinylidene fluoride, or a copolymer of vinylidene fluoride together with a monomer copolymerizable with vinylidene fluoride, or a mixture of these, having a weight-average molecular weight of preferably at least $3\times10^5$, particularly preferably $3\times10^5$ to $8\times10^5$. Examples of the monomer copolymerizable with vinylidene fluoride may include: tetrafluoroethylene, hexafluoropropylene, trifluoroethylene, chlorotrifluoroethylene and vinylidene fluoride, which may be used singly or in two or more species. The vinylidene fluoride resin may preferably comprise at least 70 mol % of vinylidene fluoride as the constituent unit. Among these, it is preferred to use homopolymer consisting of 100 mol % of vinylidene fluoride in view of its high crystallization temperature Tc (° C.) and high mechanical strength.

A vinylidene fluoride resin of a relatively high molecular weight as described above may preferably be obtained by emulsion polymerization or suspension polymerization, particularly preferably by suspension polymerization.

The vinylidene fluoride resin forming the porous membrane of the present invention may preferably have a good crystallinity, as represented by a difference Tm2−Tc of at most 32° C., preferably at most 30° C., further preferably at most 28° C., between an inherent melting point Tm2 (° C.) and a crystallization temperature Tc (° C.) of the resin as determined by DSC measurement in addition to the above-mentioned relatively large weight-average molecular weight of at least $3\times10^5$.

Herein, the inherent melting point Tm2 (° C.) of resin should be distinguished from a melting point Tm1 (° C.) determined by subjecting a procured sample resin or a resin constituting a porous membrane as it is to a temperature-increase process according to DSC. More specifically, a vinylidene fluoride resin procured generally exhibits a melting point Tm1 (° C.) different from an inherent melting point Tm2 (° C.) of the resin, due to thermal and mechanical history thereof received in the course of its production or heat-forming process, etc. The melting point Tm2 (° C.) of vinylidene fluoride resin defining the present invention defined as a melting point (a peak temperature of heat absorption according to crystal melting) observed in the course of DSC re-heating after once subjecting a procured sample resin to a prescribed temperature increase and decrease cycle in order to remove the thermal and mechanical history thereof, and details of the measurement method will be described prior to the description of Examples appearing hereinafter.

The vinylidene fluoride resin satisfying the condition of Tm2−Tc≤32° C. may preferably be provided as a mixture formed by blending 25-98 wt. %, preferably 50-95 wt. %, further preferably 60-90 wt. % of a vinylidene fluoride resin having a weight-average molecular weight of $2.0\times10^5$-6.7×

$10^5$, preferably $3.0\times10^5$-$6.5\times10^5$, further preferably $4.0\times10^5$-$6.0\times10^5$, as a medium-to-high molecular weight matrix vinylidene fluoride resin (PVDF-I) and 2-75 wt. %, preferably 5-50 wt. %, further preferably 10-40 wt. %, of a crystallinity modifier vinylidene fluoride resin of an ultra-high-molecular weight (PVDF-II) having a weight-average molecular weight that is at least 1.8 times, preferably at least 2 times, that of the medium-to-high molecular weight vinylidene fluoride resin and at most $1.2\times10^6$, wherein each vinylidene fluoride resin is selected from the above-mentioned species of the vinylidene fluoride resins. Of these, the medium-to-high molecular-weight component functions as a so-called matrix resin for keeping a high molecular weight level as a whole of the vinylidene fluoride resin and providing a hollow-fiber porous membrane with excellent strength and water permeability. On the other hand, the ultrahigh molecular weight component, combined with the above-mentioned medium-to-high molecular-weight component, raises the crystallization temperature Tc of the starting resin (generally about 140° C. for vinylidene fluoride resin alone), raises the crystallization temperature Tc' of the melt-kneaded composition together with a plasticizer described later and raises the viscosity of the melt-extrusion composition to reinforce it, thereby allowing stable extrusion in the hollow-fiber form, in spite of high plasticizer content. By raising Tc, on the occasion of the preferential cooling from the outer surface of the hollow fiber film formed by the melt-extrusion, it becomes possible to accelerate the solidification of the vinylidene fluoride resin from the inside to the inner surface of which the solidification is liable to be retarded compared with the outer film surface, so that growth of spherulites can be suppressed. Tc is preferably at least 143° C., further preferably at least 145° C. Generally, Tc of the vinylidene fluoride resin used does not substantially change in the production process of a hollow fiber. Therefore, it can be measured by using a product hollow-fiber porous membrane as a sample according to the DSC method described later.

If the Mw of the ultra-high molecular weight vinylidene fluoride resin (PVDF-II) is less than 1.8 times the Mw of the medium-to-high molecular weight resin(PVDF-I), it becomes difficult to fully suppress the growth of spherulites, and if the Mw exceeds 1,200,000 on the other hand, it becomes difficult to uniformly disperse it in the matrix resin.

Both vinylidene fluoride resins of a medium-to-high molecular weight and an ultra-high molecular weight as described above, may preferably be obtained by emulsion polymerization or suspension polymerization, particularly preferably by suspension polymerization.

Moreover, if the addition amount of the ultra-high molecular weight vinylidene fluoride resin is less than 2 wt. %, the effects of spherulite suppression and viscosity-increasing and reinforcing the melt-extrusion composition are not sufficient, and in excess of 75 wt. %, there result in increased tendencies such that the texture of phase separation between the vinylidene fluoride resin and the plasticizer becomes excessively fine to result in a porous membrane exhibiting a lower water permeation rate when used as a microfiltration membrane, and the stable film or membrane formation becomes difficult due to melt fracture during the processing.

In the production process of the present invention, a plasticizer is added to the above-mentioned vinylidene fluoride resin, to form a starting composition for formation of the membrane.

(Plasticizer)

The hollow-fiber porous membrane of the present invention is principally formed of the above-mentioned vinylidene fluoride resin, but for the production thereof, it is preferred to use at least a plasticizer for vinylidene fluoride resin as a pore-forming agent in addition to the vinylidene fluoride resin. The plasticizer used in the present invention is one which is mutually soluble with the vinylidene fluoride resin at the melt-kneading temperature and also provides to the melt-kneaded mixture with the vinylidene fluoride resin a crystallization temperature Tc' (° C.) that is substantially identical to (namely, within a range of ±5° C., preferably ±4° C., still more preferably ±2° C. from) the crystallization temperature Tc (° C.) of the vinylidene-fluoride-resin alone. Such a plasticize may generally be chosen from plasticizers comprising polyesters of a dibasic acid and a glycol, so as to provide a number-average molecular weight (as calculated from a saponification value and a hydroxyl value measured according to JIS K0070) of at least 1200, more preferably at least 1500, and further preferably at least 1700. A larger molecular weight of polyester plasticizer tends to provide a higher mutual solubility with vinylidene fluoride resin, but an excessively large molecular weight is liable to require a long time for extraction-removal of the plasticizer in a extraction step described later, so that a number-average molecular weight exceeding 10,000 is not preferred. Generally, a viscosity measured at 25° C. according to JIS K7117-2 (by means of a cone-plate type rotating viscometer) may also be frequently used as a measure of degree of polymerization of a polyester plasticizer, and one having at least 1000 mPa-s and at most 1000 Pa-s may preferably be used.

As a dibasic acid component giving such a polyester plasticizer, it is preferred to use an aliphatic dibasic acid having 4-12 carbon atoms. Examples of such aliphatic dibasic acids may include: succinic acid, maleic acid, fumaric acid, glutamic acid, adipic acid, azelaic acid, sebacic acid, and dodecanedicarboxylic acid. Among these, aliphatic dibasic acids having 6-10 carbon atoms are preferred so as to provide a polyester plasticizer with good mutual solubility with vinylidene fluoride resin, and adipic acid is particularly preferred in view of its commercial availability. These aliphatic dibasic acids may be used alone or in combination of two or more species thereof.

As a glycol component which constitutes a polyester plasticizer, it is preferred to use a glycol having 2-18 carbon atoms, and examples thereof may include: aliphatic dihydric alcohols, such as ethylene glycol, 1,2-propylene glycol, 1,2-butanediol, 1,3-butanediol, 1,4-butanediol, 2-methyl-1,3-propanediol, neopentyl glycol, 1,5-pentanediol, 1,6-hexanediol, 2,2-diethyl 1,3-propanediol, 2,2,4-tri-methyl-1,3-pentanediol, 2-ethyl-1,3-hexanediol, 1,9-nonanediol, 1,10-decanediol, 2-butyl-2-ethyl-1,5-propanediol, and 1,12-octadecanediol; and polyalkylene glycols, such as diethylene glycol and dipropylene glycol, are mentioned. Particularly, glycols having 3-10 carbon atoms may preferably be used. These glycols may be used alone or in combination of two or more species thereof.

Generally, in order to cap the molecular chain terminals of a polyester plasticizer, a monohydric alcohol or a monobasic carboxylic acid may be used. Examples of such a monohydric alcohol may include: monohydric alcohols of 2-22 carbon atoms, such as butyl alcohol, hexyl alcohol, isohexyl alcohol, heptyl alcohol, octyl alcohol, isooctyl alcohol, 2-ethylhexyl alcohol, nonyl alcohol, isononyl alcohol, 2-methyloctyl alcohol, decyl alcohol, isodecyl alcohol, undecyl alcohol, dodecyl alcohol, tridecyl alcohol, a tetradecyl alcohol, hexadecyl alcohol, octadecyl alcohol, etc. It is particularly preferred to use a monohydric alcohol having 9-18 carbon atoms, which generally tends to provide a plasticizer capable of suppressing the decrease of crystallization temperature Tc' of the melt-kneaded material with the vinylidene fluoride resin.

Especially, isononyl alcohol is preferred from the viewpoint of the balance of mutual solubility with vinylidene fluoride resin and the capability of suppressing the lowering of Tc'. These monohydric alcohols may be used alone or in combination of two or more species thereof.

On the other hand, the monobasic carboxylic acids may include: aliphatic monobasic carboxylic acids having 6-22 carbon atoms derived from animal-and-vegetable oils and fats or the hardened oils thereof; or synthetic monobasic carboxylic acids of 2-18 carbon atoms, such as acetic acid, butyric acid, isobutyric acid, heptanoic acid, an isooctanoic acid, 2-ethyl hexanoic acid, nonanoic acid, and isostearic acid; and aromatic carboxylic acids, such as benzoic acid, toluic acid, dimethylaromatic mono-carboxylic acid, ethylaromatic monocarboxylic acid, a cumin acid, tetramethylaromatic monocarboxylic acid, naphthoic acid, biphenylcarboxylic acid, and furoic acid. These may be used alone or in combination of two or more species thereof.

A polyester plasticizer having a relatively large molecular weight, when added alone, tends to lower the crystallization temperature Tc' of the melt-kneaded material with vinylidene fluoride resin, so that it is preferred to add a mutual solubility inhibitor in addition to such a polyester plasticizer. As such a mutual solubility inhibitor, it is preferred to use a monomeric ester plasticizer which is an ester between a dibasic acid selected from aromatic dibasic acids, such as phthalic acid and trimellitic acid or aliphatic dibasic acids, such as adipic acid, and a monohydric alcohol of 2-22 carbon atoms, and is mutually insoluble with vinylidene fluoride resin. Especially, it is preferred to use a monomeric ester plasticizer between an aliphatic dibasic acid of 6-10 carbon atoms, especially adipic acid, and a monohydric alcohol of 2-22 carbon atoms, especially 6-18 carbon atoms. Moreover, it is preferred to use a monomeric ester plasticizer consisting of a dibasic acid and a monohydric alcohol, wherein the dibasic acid is common to the dibasic acid of the polyester plasticizer or/and the monohydric alcohol has an identical number of carbon atoms with the glycol or the terminal-capping monohydric alcohol of the polyester plasticizer, in view of good mutual solubility with the polyester plasticizer. In case where used in combination with an adipic acid-based polyester plasticizer including adipic acid as a dibasic acid and a terminal capped with nonyl alcohol, which is preferably used in the present invention, it is suitable to use diisononyl adipate (DINA).

Such a monomeric ester plasticizer may be used in a quantity, which should be determined depending on the Tc'-decreasing power of the polyester plasticizer to be used, and should preferably be determined experimentally, so as not to impair the mutual solubility with the vinylidene fluoride resin but to suppress the Tc'-decreasing power as much as possible. This is because the Tc' decrease power of a polyester plasticizer is intricately affected with a chemical structure, a number average molecular weight (degree of polymerization), a molecular weight distribution, etc., of components, such as a dibasic acid, a glycol component and a monohydric alcohol of the polyester plasticizer, and cannot be generally predicted. For example, in the case of using a polyester plasticizer having a number-average molecular weight of 1800 and consisting of adipic acid, 1,2-butanediol and isononyl alcohol, good results have been obtained, if a monomeric ester plasticizer is used in a mixed proportion of preferably 2-30 wt. %, more preferably 5-25 wt. %, most preferably 8-20 wt. %, with respect to a total amount with the polyester plasticizer. Moreover, in the case of using a polyester plasticizer having a number-average molecular weight of 2200 and consisting of adipic acid, 1,4-butanediol and octyl alcohol, good results have been obtained, if a monomeric ester plasticizer is used in a mixed proportion of preferably 5-50 wt. %, more preferably 10-45 wt. %, most preferably 15-40 wt. %, with respect to a total amount with the polyester plasticizer.

By using a vinylidene fluoride resin having a preferred molecular weight characteristic, and selecting a preferred polyester plasticizer (further a mutual solubility inhibitor), as described above, it becomes possible to provide the melt-kneaded material of a vinylidene fluoride resin and a plasticizer with a crystallization temperature Tc' of preferably at least 140° C., more preferably at least 143° C., further preferably at least 145° C. It is, however, generally difficult to realize a Tc' exceeding 170° C.

Furthermore, in order to shorten the time for melt-kneading the polyester plasticizer and the vinylidene fluoride resin, or in order to perform viscosity adjustment of the melt-kneaded material, it is possible to add a solvent or monomeric ester plasticizer which is mutually insoluble with a cooling liquid (preferably water) mentioned later and mutually soluble with vinylidene fluoride resin. Examples of such a solvent may include propylene carbonate, and examples of such a monomeric ester plasticizer may include dialkylene glycol dibenzoate consisting of glycol and benzoic acid. However, such a solvent or a monomeric ester plasticizer is liable to lower the Tc' of melt-kneading material if it is used excessively, so that amount thereof should be suppressed to at most 10 wt. %, particularly at most 5 wt. %, with respect to a total amount with the plasticizer.

In the present invention, the polyester plasticizer (or a mixture of the polyester plasticizer with the mutual solubility inhibitor, etc.) is required to have a mutual solubility with the vinylidene fluoride resin to such an extent that it provides a melt-kneaded mixture which is clear (that is, it does not leave a material giving a turbidity recognizable with naked eyes) when melt-kneaded with vinylidene fluoride resin by means of an extruder. However, the formation of a melt-knead mixture by means of an extruder includes factors, such as mechanical conditions, other than those originated from starting materials, so that the mutual solubility is judged according to a mutual solubility evaluation method as described later is used in the present invention in order to eliminate such other factors.

(Composition)

The starting material composition for forming a porous-membrane may preferably comprise: 20-50 wt. %, preferably 25-40 wt. %, of vinylidene fluoride resin, and 50-80 wt. %, preferably 60-85 wt. %, of a plasticizer (including a polyester plasticizer and a mutual solubility inhibitor (monomeric ester plasticizer), when used in addition to the polyester plasticizer). The optional ingredients, such as a water-insoluble solvent, etc., may used in consideration of the melt viscosity under melt-kneading of the material composition, etc., in such a manner as to replace a portion of the plasticizer.

If the amount of the plasticizer is too small, it becomes difficult to achieve an increased porosity of the dense layer as an object of the present invention, and if too large, the melt viscosity is lowered excessively, thus being liable to result in collapse of hollow fiber film in the case of forming a hollow-fiber membrane and also lower mechanical strengths of the resultant porous membrane.

(Mixing and Melt-extrusion)

The melt-extrusion composition at a barrel temperature of 180-250° C., preferably 200-240° C., may be extruded into a hollow-fiber film by extrusion through a T-die or an annular nozzle at a temperature of generally 150-270° C., preferably 170-240° C. Accordingly, the manners of mixing and melting of the vinylidene fluoride resin, and the plasticizer and optionally added non-water-miscible solvent (which may be hereinafter inclusively referred to as "plasticizer, etc.") are arbitrary as far as a uniform mixture in the above-mentioned temperature range can be obtained consequently. According to a preferred embodiment for obtaining such a composition, a twin-screw kneading extruder is used, and the vinylidene fluoride resin (preferably in a mixture of a principal resin and a crystallinity-modifier resin) is supplied from an upstream side of the extruder and the plasticizer, etc., are supplied at a downstream position to be formed into a uniform mixture until they pass through the extruder and are discharged. The twin-screw extruder may be provided with a plurality of blocks capable of independent temperature control along its longitudinal axis so as to allow appropriate temperature control at respective positions depending on the contents of the materials passing therethrough.

(Cooling)

Then, the melt-extruded hollow-fiber film is cooled preferentially from an outside thereof and solidified by introducing it into a cooling liquid bath containing a liquid (preferably water) that is inert (i.e., non-solvent and non-reactive) to vinylidene fluoride resin, at −40-90° C., preferably 0-90° C., more preferably 5-65° C., to form a film. In this instance, if a hollow-fiber film is cooled while an inert gas, such as air or nitrogen, is injected into the hollow part thereof, a hollow-fiber film having an enlarged diameter can be obtained. This is advantageous for obtaining a hollow-fiber porous membrane which is less liable to cause a lowering in water permeation rate per unit area of the membrane even at an increased length of the hollow-fiber membrane (WO2005/03700A). for the formation of a planar film, the cooling from one side thereof can be effected by showering with a cooling liquid or cooling by means of a chill roll. At a cooling medium temperature below −40° C., the solidified film becomes brittle to make the drawing difficult. Below 0° C., moisture in the atmosphere is liable to cause dew or frost, thus resulting in a difficulty of requiring a complex apparatus. On the other hand, in excess of 90° C., it becomes difficult to form a porous membrane having a small surface pore size and a gradient pore size distribution aimed at by the present invention.

The difference $Tc'-Tq$ between the crystallization temperature $Tc'$ of the kneaded composition of the vinylidene fluoride resin and the plasticizer, and the temperature $Tq$ of the inert liquid for cooling, is preferably at least 80° C., further preferably 95° C. or more, most preferably 110° C. or more. It is difficult for the temperature difference to exceed 210° C., and a temperature difference exceeding 150° C. generally requires a cooling liquid temperature of less than 0° C., thus being undesirable because the use of water as preferred cooling liquid becomes difficult.

In order to prevent the collapse of a melt-extruded hollow-fiber film, it is preferred to take a time after the melt-extrusion and before entering the cooling bath (i.e., an air gap passage time=air gap/melt-extrudate take-up speed), which is generally 0.3-10.0 sec., particularly 0.5-5.0 sec.

(Extraction)

The cooled and solidified film is then introduced into an extraction liquid bath to remove the plasticizer, etc. therefrom. The extraction liquid is not particularly restricted provided that it does not dissolve the vinylidene fluoride resin while dissolving the plasticizer, etc. Suitable examples thereof may include: polar solvents having a boiling point on the order of 30-100° C., inclusive of alcohols, such as methanol and isopropyl alcohol, and chlorinated hydrocarbons, such as dichloromethane and 1,1,1-trichloroethane.

(Stretching)

The film or membrane after the extraction may preferably be subjected to stretching in order to increase the porosity and pore size and improve the strength-elongation characteristic thereof. It is particularly preferred to selectively wet the film or porous membrane after extrusion down to a certain depth from the outer surface thereof, prior to the stretching, and then effect the stretching in this state (which may be hereinafter referred to as "partially wet stretching"), for the purpose of attaining a high porosity A1 of dense layer. More specifically, prior to the stretching, the porous membrane is wetted to a certain depth of at least 5 μm, preferably at least 7 μm, further preferably at least 10 μm and at most ½, preferably at most ⅓, further preferably ¼ or less, of the membrane thickness. A wet depth of less than 5 μm is insufficient for an increase of dense layer porosity A1, and a wet depth in excess of ½ is liable to result in uneven drying of the wetting liquid during dry heat relaxation after the stretching, thus leading to uneven heating and relaxation effect.

The reason why the above-mentioned partially wet stretching is effective for providing an increased dense layer porosity A1 has not been clarified as yet but is adduced as follows by the present inventors. During a longitudinal stretching, a compression force acts in a thicknesswise direction, and as a result of wetting to a certain depth from the outer surface, (a) thermal conduction within a heating bath is improved to alleviate a temperature gradient in the dense layer and reduce the compression forth in the thickness direction, and (b) the pores are filled with the liquid so that the pores are not readily collapsed even if the thicknesswise compression force is applied thereto.

As a specific method for wetting down to a certain depth from an outer surface, it is possible to apply a solvent wetting vinylidene fluoride resins, such as methanol and ethanol, or an aqueous solution thereof selectively to the outer surface of the porous-membrane. However, in order to provide a selective applicability to the outer surface of a vinylidene-fluoride-resin porous membrane, the application of (inclusive of application by dipping within) a wettability promoter liquid having a surface tension of 25-45 mN/m is preferred. A surface tension less than 25 mN/m provides an excessively fast penetration to the PVDF porous membrane, thus being liable to make difficult the selective application of the wettability promoter liquid onto the outer surface, and a surface tension exceeding 45 mN/m is liable to cause the wettability promoter liquid to be repelled by the outer surface of the PVDF porous membrane, thus making difficult the uniform application of the liquid onto the outer surface, because of insufficient wettability or penetrability to the PVDF porous membrane. It is particularly preferred to use a surfactant liquid (i.e., an aqueous solution or aqueous homogeneous dispersion liquid of a surfactant) obtained by adding a surfactant into water as such a wettability promoter liquid. The type of surfactant is not particularly limited, and examples thereof may include: anionic surfactants inclusive of carboxylate salt type, such as an aliphatic-monocarboxylic-acid salt, sulfonic acid type, such as an alkylbenzene sulfonate, sulfate type, such as an alkyl sulfate salt, and phosphate type, such as a phosphoric acid alkyl salt; cationic surfactants, inclusive of amine salt type, such as an alkylamine salt, and quaternary ammonium salt type, such as an alkyl trimethyl-ammonium salt; nonionic surfactants, inclusive of ester types, such as a glycerin fatty acid ester, ether type, such as polyoxyethylene alkyl phenyl ether, ester ether type, such as polyethylene glycol fatty acid ester; amphoteric surfactants inclusive of carboxy betaine type, such as N,N-dimethyl-N-alkyl betaine aminoacetate, and glycin type, such as 2-alkyl 1-hydroxyethyl carboxymethyl-imidazolinium betaine, etc. Poly-glycerin fatty acid esters are particularly preferably used as wettability promoter liquids which are free from hygienic problem even if they finally remain in the product porous membrane.

The surfactant may preferably be one having an (hydrophile-lipophilie balance) of 8 or more. At an HLB of less than 8, the surfactant is not finely dispersed in water, so that it becomes difficult to effect uniform wettability promotion. A particularly preferred class of surfactants may include: nonionic surfactants or ionic (anionic, cationic, amphoteric) surfactants having an HLB of 8-20, further preferably 10-18, and a nonionic surfactant is especially preferred.

In many cases, the application of the wettability promoter liquid to the porous-membrane outer surface, may preferably be performed by batchwise or continuous dipping of the porous membrane. The dipping treatment functions as an application on both surfaces for a planar membrane and an application on a single surface for a hollow-fiber membrane. The batch dipping treatment of a planar membrane may be applied to a pile of sheets cut in appropriate sizes, and the batch dipping treatment of a hollow-fiber membrane is performed by dipping of the hollow-fiber membrane wound about a bobbin or the like. In the case of batch processing, it is preferred to form relatively large emulsion particles by using a surfactant with a relatively low HLB in the above-mentioned range, more specifically an HLB of 8-13. The continuous processing is performed by continuously feeding and passing an elongated membrane through a treating liquid, both in the case of planar membrane and a hollow-fiber membrane. In case of applying only to one side of a planar membrane, spraying of a treatment solution is also used preferably. In the case of continuous processing, it is preferred to form relatively small emulsion particles by using a surfactant with a relatively high HLB in the above-mentioned range, more specifically an HLB of 8-20, more preferably 10-18.

Although there is no particular limitation in the viscosity of a wettability promoter liquid, it is possible to moderately retard the penetration speed by providing the wettability promoter liquid with a higher viscosity or to accelerate the penetration rate by using a lower viscosity, depending on the manner of applying a wettability promoter liquid.

Although there is no particular restriction in the temperature of the wettability promoter liquid, it is possible to moderately retard the penetration speed by using a lower temperature of wettability promoter liquid or to use a higher temperature to accelerate the penetration speed, depending on the manner of applying a wettability promoter liquid. Thus, the viscosity and temperature of the wettability promoter liquid can act in mutually opposite directions and can be complementarily controlled for adjustment of the penetration rate of the wettability promoter liquid.

(Stretching)

The stretching of a hollow-fiber membrane may preferably be effected as a uniaxial stretching in the longitudinal direction of the hollow-fiber membrane by means of, e.g., a pair of rollers rotating at different circumferential speeds. This is because it has been found that a microscopic texture including a stretched fibril portion and a non-stretched node portion appearing alternately in the stretched direction is preferred for the hollow-fiber porous membrane of vinylidene fluoride resin of the present invention to exhibit a harmony of porosity and strength-elongation characteristic thereof. The stretching ratio may suitably be on the order of 1.1-4.0 times, particularly about 1.2-3.0 times, most preferably about 1.4-2.5 times. If the stretching ratio is excessively large, the hollow-fiber membrane can be broken at a high liability. The stretching temperature may preferably be 25-90° C., particularly 45-80° C. At too low a stretching temperature, the stretching becomes nonuniform, thus being liable to cause the breakage of the hollow-fiber membrane. On the other hand, at an excessively high temperature, enlargement of pore sizes cannot be attained even at an increased stretching ratio, so that it becomes difficult to attain an increased water permeation rate. In the case of a planar membrane, it is also possible to effect successive or simultaneous biaxial stretching. It is also preferred to heat-treat the porous membrane for 1 sec.-18000 sec., preferably 3 sec.-3600 sec., in a temperature range of 80-160° C., preferably 100-140° C., to increase the crystallinity in advance of the stretching for the purpose of improving the stretchability.

(Relaxation Treatment)

The hollow-fiber porous membrane of vinylidene fluoride resin obtained through the above-mentioned steps may preferably be subjected to at least one stage, preferably at least two stages, of relaxation or fixed length heat treatment in a non-wetting environment (or medium). The non-wetting environment may be formed of non-wetting liquids having a surface tension (JIS K6768) larger than a wet tension of vinylidene fluoride resin, typically water, or almost all gases including air as a representative. The relaxation may be effected by passing a hollow-fiber porous membrane stretched in advance through the above-mentioned non-wetting, preferably heated environment disposed between an upstream roller and a downstream roller rotating at successively decreasing circumferential speeds. The relaxation percentage determined by (1−(the downstream roller circumferential speed/the upstream roller circumferential speed))×100 (%) may preferably be totally 0% (fixed-length heat treatment) to 50%, particularly 1-20% of relaxation heat treatment. A relaxation percentage exceeding 20% is difficult to realize or, even if possible, can only result in a saturation or even a decrease of the effect of increasing the water permeation rate, while it may somewhat depend on the stretching ratio in the previous step, so that it is not desirable.

The first stage relaxation temperature may preferably be 0-100° C., particularly 50-100° C. The relaxation treatment time may be either short or long as far as a desired relaxation percentage can be accomplished. It is generally on the order of from 5 second to 1 minute but need not be within this range.

A latter stage relaxation treatment temperature may preferably be 80-170° C., particularly 120-160° C., so as to obtain a relaxation percentage of 1-20%.

The effect of the above-mentioned relaxation treatment is an increase in water permeation rate of the resultant hollow-fiber porous membrane, while substantially retaining a sharp pore size distribution. If the above-mentioned treatment is performed at a fixed length, it becomes a heat-setting after stretching.

(Porous Membrane of Vinylidene Fluoride Resin)

The porous membrane according to the present invention obtained through the above-mentioned series of steps is a substantially single layer of vinylidene fluoride resin having two major surfaces sandwiching a certain thickness, and a pore size distribution including a dense layer which governs filtration performance on the side of water to be treated and a sparse layer which contributes to reinforcement on the side of permeated water, and having an asymmetrical gradient network texture including pore sizes which increase continuously from the side of water to be treated to the side of permeated water, and is also characterized by morphological characteristics, as follows:

(a) the dense layer includes a 7 μm-thick portion contiguous to the surface on the side of water to be treated showing a porosity $A1$ of at least 50%, preferably at least 55% (the upper limit thereof is not particularly limited but a porosity $A1$ exceeding 85% is generally difficult to realize), and (b) a ratio A1/P1 of at least 200, preferably at least 350, further preferably 400 or larger, between the porosity A1 (%) and the surface pore size P1 (μm) on the surface on the side of water to be treated (the upper limit thereof is not particularly limited but a ratio A1/P1 exceeding 1000 is generally difficult to realize).

(c) Further, preferably, the dense layer continuous from the surface on the side of water to be treated, includes a uniform pore size layer portion (herein defied as a thickness portion having a pore size that is at most 1.2 times $X_{1.5}$ (μm), wherein $X_{1.5}$ denotes a pore size at a thickness of 1.5 μm from the surface) showing a thickness of at least 15 μm, preferably at least 20 μm, most preferably 40 μm or lager, according to a cross-sectional observation through a scanning electron microscope (SEM).

(d) Moreover, the inclined pore size distribution of the porous membrane of the present invention may be represented by a ratio P2/P1 of preferably 2.0-10.0 between the surface pore size P1 (μm) on the side of water to be treated and the surface pore size P2 (μm) on the permeated water side.

The above-mentioned feature (a) of the porosity A1 of the dense layer being at least 50% represents that the dense layer which governs the filtration power of the porous membrane of the present invention has a high porosity. The feature (b) of the ratio A1/P1 being at least 350 represents that the porous membrane of the present invention satisfies apparently contradictory characteristics that the surface pore size on the side of water to be treated has a pore size and the dense layer contiguous to the surface has a high porosity A1. Moreover, a preferred feature (c) represents that the dense layer of a uniform pore size showing a uniform filtration power in the porous membrane of the present invention is thick to such an extent that it has not been realized so far. The surface pore size P1 on the side of water to be treated is preferably at most 0.30 μm, more preferably at most 0.20 μm, still more preferably 0.15 μm or less. There is no particular lower limit with respect to P1, but it is generally difficult to realize a P1 below 0.01 μm. The ratio A1/A2 between the porosity A1 of a 10 μm-thick portion contiguous to the surface on the side of water to be treated and a whole layer porosity A2 is at least 0.65, preferably at least 0.7, and the upper limit thereof is not particularly restricted, whereas it generally does not exceed 1.1 since the membrane basically has an inclined pore size distribution. The whole layer porosity A2 (%) is preferably 70 to 85%, more preferably 75 to 82%.

Other general features of the porous membranes of the present invention, when formed in a hollow-fiber form, may include: an average pore size Pm of generally at most 0.25 μm, preferably 0.20-0.01 μm, more preferably 0.15-0.05 μm, and a maximum pore size Pmax of generally 0.70-0.03 μm, preferably 0.40-0.06 μm, respectively as measured by the half-dry/bubble point method (ASTM-F 316-86 and ASTM-E 1294-86); a tensile strength of at least 7 MPa, preferably at least 8 MPa; an elongation at break of at least 70%, preferably at least 100%. The thickness is ordinarily in the range of 50-800 μm, preferably 50-600 μm, particularly preferably 150-500 μm. The outer diameter in the form of a hollow fiber may suitably be on the order of 0.3-3 mm, particularly about 1-3 mm. A hollow-fiber membrane may exhibit a pure water permeability of at least 5 m/day, preferably at least 10 m/day, more preferably at least 15 m/day, most preferably 20 m/day or more, as measured at a test length of 200 mm, a temperature of 25° C., and a pressure difference of 100 kPa.

EXAMPLES

Hereinbelow, the present invention will be described more specifically based on Examples and Comparative Examples. The properties described herein including those described below are based on measured values according to the following methods.

(Crystalline Melting Points Tm1, Tm2, Crystal Melting Enthalpy and Crystallization Temperature Tc, Tc')

A differential scanning calorimeter "DSC-7" (made by Perkin-Elmer Corp.) was used. A sample resin of 10 mg was set in a measurement cell, and in a nitrogen gas atmosphere, once heated from 30° C. up to 250° C. at a temperature-raising rate of 10° C./min., then held at 250° C. for 1 min. and cooled from 250° C. down to 30° C. at a temperature-lowering rate of 10° C./min., thereby to obtain a DSC curve. On the DSC curve, an endothermic peak temperature in the course of heating was determined as a melting point Tm1 (° C.), and a heat of absorption by the endothermic peak giving Tm1 was measured as a crystal melting enthalpy. Further, an exothermic peak temperature in the course of cooling was determined as a crystallization temperature Tc (° C.). Successively thereafter, the sample resin was held at 30° C. for 1 min., and re-heated from 30° C. up to 250° C. at a temperature-raising rate of 10° C./min. to obtain a DSC curve. An endothermic peak temperature on the re-heating DSC curve was determined as an inherent melting point Tm2 (° C.) defining the crystallinity of vinylidene fluoride resin in the present invention.

Further, for the measurement of a crystallization temperature Tc' (° C.) of a mixture of a vinylidene fluoride resin and a plasticizer etc., as a film starting material, a sample comprising 10 mg of a first intermediate form obtained by melt-kneading through an extruder and extruded out of a nozzle, followed by cooling and solidification, was subjected to a temperature raising and lowering cycle identical to the one described above to obtain a DSC curve, on which an exothermic temperature in the course of cooling was detected as a crystallization temperature Tc' (° C.) of the mixture.

(Mutual Solubility)

A mutual solubility of a polyester plasticizer, a monomeric ester plasticizer, or a mixture of these (which are each referred to in this section as simply "plasticizer") with vinylidene fluoride resin was evaluated in the following manner:

23.73 g of vinylidene fluoride resin and 46.27 g of a plasticizer are mixed at a room temperature, to obtain a slurry mixture. Then, a barrel of a mixer ("LABO-PLASTOMILL" Mixer Type "R-60", made by Toyo Seiki K.K.) is set to a prescribed temperature which is higher than the melting point of the vinylidene fluoride resin by 10° C. or more (e.g., by 17-37° C.), and the above slurry mixture is fed to the mixer and melt-kneaded therein at mixer rotation speed of 50 rpm. In case where the mixture becomes clear (to such an extent that it does not leave a material giving turbidity recognizable with naked eyes) within 10 minutes, the plasticizer is judged to be mutually soluble with the vinylidene fluoride resin. In some cases, the melt-kneaded mixture can be viewed opaque due to entanglement of bubbles, e.g., because of a high viscosity of the melt-kneaded mixture. In such a case, the judgment should be made after evacuation as by heat pressing, as required. In case where the mixture is solidified by cooling, the mixture is heated again into a melted state to effect the judgment.

(Weight-average Molecular Weight (Mw))

A GPC apparatus ("GPC-900", made by Nippon Bunko K.K.) was used together with a column of "Shodex KD-806M" and a pre-column of "Shodex KD-G" (respectively made by Showa Denko K.K.), and measurement according to GPC (gel permeation chromatography) was performed by using NMP as the solvent at a flow rate of 10 ml/min. at a temperature of 40° C. to measure polystyrene-based molecular weights.

(Whole Layer Porosity A2)

An apparent volume V (cm$^3$) of a porous membrane (either a planar membrane or a hollow-fiber membrane) was calculated, and also a weight W (g) of the porous membrane was measured, to determine the whole layer porosity A2 from the following formula:

$$\text{Whole layer porosity } A2\ (\%) = (1 - W/(V \times \rho)) \times 100 \quad \text{[Formula 1]}$$

ρ: Specific gravity of PVDF (=1.78 g/cm$^3$).

Incidentally, a ratio A0/RB between a non-stretched whole layer porosity A0 measured in a similar manner as above with respect to a membrane after extraction but before stretching and a proportion RB (wt. %) of a mixture B of a plasticizer (and a solvent, if any) in the melt-extruded composition, is taken to roughly represent a pore-forming efficiency of the mixture B.

(Average Pore Size)

An average pore size Pm (μm) was measured according to the half dry method based on ASTM F316-86 and ASTM E1294-89 by using "PERMPOROMETER CFP-2000AEX" made by Porous Materials, Inc. A perfluoropolyester (trade name "Galwick") was used as the test liquid.

(Maximum Pore Size)

A maximum pore size Pmax (μm) was measured according to the bubble-point method based on ASTM F316-86 and ASTM E1294-89 by using "PERMPOROMETER CFP-2000AEX" made by Porous Materials, Inc. A perfluoropolyester (trade name "Galwick") was used as the test liquid.

(Surface Pore Size P1 on the Side of Water-to-be-Treated and Surface Pore Size P2 on the Permeated Water Side)

A porous-membrane sample (of either planar or t hollow-fiber form) was subjected to measurement of an average pore size P1 on the water-to-be-treated side surface (an outer surface with respect to a hollow fiber) and an average pore size P2 on the permeated water side surface (an inner surface with respect to a hollow fiber) by the SEM method (SEM average pore size). Hereafter, a measurement method is described with respect to a hollow-fiber porous-membrane sample for an example. About the outer surface and inner surface of a hollow-fiber membrane sample, SEM-photographs are respectively taken at an observation magnification of 15,000 times. Next, each SEM photograph is subjected to measurement of pore sizes with respect to all recognizable pores. A major axis and a minor axis are measured for each pore, and each pore size is calculated according to a formula of: pore size=(major-axis+minor axis)/2. An arithmetic mean of all the measured pore size, is take to determine an outer surface average pore size P1 and an inner-surface average pore size P2, respectively. Incidentally, in case where too many pores are observed in a taken photographic image, it is possible to divide the photographic image into four equal areas and performing the above-mentioned pore size measurement with respect to one area (¼ picture). In the case where the pore size measurement is performed based on a ¼ picture with respect to an outer surface of the hollow-fiber membrane of the present invention, the number of examined pores will be roughly about 200 to 300.

(Dense Layer Thickness)

About a porous-membrane sample (of a planar or hollow-fiber form), the thickness of a layer contiguous to the surface on the water-to-be-treated side (the outer surface for a hollow fiber) in which a pore size is almost uniform, is measured by a cross-sectional observation through a SEM. Hereafter, a measuring method is described with reference to a hollow-fiber porous-membrane sample. A hollow-fiber porous-membrane sample is first dipped in isopropyl alcohol (IPA) to be impregnated with IPA, then immediately dipped in liquid nitrogen to be frozen, and bent in the frozen state, to expose a cross-section perpendicular to the longitudinal direction thereof. The exposed cross-section is sequentially SEM-photographed at an observation magnification of 15,000 times from the outer surface side to the inner surface side. Next, pore sizes are measured about all recognizable pores in a 3 μm×3 μm-square region around a point of 1.5 μm from the outer surface with the center on the outermost SEM photograph. A major axis and a minor axis are measured for each pore, and each pore size is calculated according to a formula of: pore size=(major-axis+minor axis)/2. An arithmetic mean of all the measured pore sizes, is taken as a cross-sectional pore size $X_{1.5}$ (μm) at a depth of 1.5 μm. Then, with respect to a 3 μm×3 μm-square region shifted by 3 μm toward the inner surface side, an arithmetic mean pore size is obtained, similarly as above. This sequential determination of cross-sectional pore sizes is continued to obtain a cross-sectional pore size $X_d$ (μm) at an arbitrary depth of d μm from the outer surface. If the condition $X_d/X_{1.5} \leq 1.2$ is satisfied, it is assumed to represent a uniform pore size, and a maximum depth d (μm) satisfying the condition is taken as a dense layer thickness with a uniform pore size.

(Dense Layer Porosity A1)

A porous-membrane sample (of either a planar or hollow-fiber form) is subjected to measurement of a porosity A1 of a 7 μm-thick portion contiguous to the water-to-be-treated side surface (hereinafter referred to as a "dense layer porosity A1") is measured by an impregnation method. Hereafter, a measurement method is described with respect to a hollow-fiber porous-membrane sample for an example. First, a hollow-fiber porous-membrane sample is cut in a length L=about 300 mm, both ends of a hollow part thereof are sealed by heat-pressure bonding or with an adhesive, and the weight W0 (mg) thereof is measured. Then, the both end-sealed hollow-fiber membrane sample is dipped in a test liquid of glycerin ("Refined glycerin D", made by Lion K.K.) containing 0.05 wt. % of a dye ("Cation Red", made by Kiwa Kagaku Kogyo K.K.) and about 0.1 wt. % of fatty acid glycerol ester ("MO-7S" made by Sakamoto Yakuhin Kogyo K.K.; HLB value=12.9) and taken out, followed by wiping-out of the test liquid on the surface and further weighing at W (mg). Subsequently, the sample after the weighing is sliced with a razor into a ring, of which the portion impregnated (i.e., dyed) with the test liquid is measured at a thickness t (μm). Impregnation thickness t is adjusted to t=7±1 (μm) by adjusting the dipping time in the test liquid and the aliphatic glycerol ester concentration in the test liquid. The volume V (ml) of the sample portion impregnated with the test liquid is calculated by the following formula based on the outer diameter OD of the above-mentioned sample (mm), length L (mm), and impregnation thickness t (μm):

$$V = \pi \times ((OD/2)^2 - (OD/2 - t/1000)^2) \times L/1000$$

A volume VL (ml) of the impregnating test liquid is calculated by the following formula from the difference between the weight W0 (mg) of the sample before dipping and the weight W (mg) of the sample after dipping:

$$VL = (W - W0)/(\rho s \times 1000),$$

Wherein ρs denotes a specific gravity of test liquid and is 1.261 (g/ml).

A dense layer porosity A1 (%) is calculate by the following formula:

$$A1 = VL/V \times 100.$$

(Dense Layer Porosity A1 (5 μm))

Incidentally, the dense layer porosity A1 measured for an impregnation thickness t=7 μm with a test liquid measured as mentioned above (hereinafter called "dense layer porosity A1 (7 μm) in this section), is empirically known to provide a little smaller value than a dense layer porosity of a 10 μm-thick portion contiguous to the water-to-be-treated side surface measured by a focused ion beam-scanning electron microscope (dense layer porosity according to FIB-SEM) (FIB-SEM method. The details of the measuring method are described in WO2010/082437). This is considered that a dense layer porosity was given at a lower value because the test liquid used by the above-mentioned did not penetrate into some pore portions because of a rather high surface tension. However, as a result of further study, it has been found that when the fatty acid glycerol ester composition in the test liquid is increased from about 0.1 wt. % to about 1.0 wt. % so as to provide the test liquid with a lower surface tension, a dense layer porosity A1 (5 μm) measured at a test liquid impregnation thickness t=5 μm similarly as in the above-described measuring method of the dense layer porosity A1 (7 μm), shows a good coincidence with the above-mentioned dense layer porosity measured according to the FIB-SEM-method. However, the dense layer porosity A1 (7 μm) obtained by the above-described method also shows a good correlation with the dense layer porosity A1 (5 μm), as shown in Table 1 and 2 showing the results of Examples and a Comparative Examples described hereinafter, so that the dense layer porosity A1 (7 μm) can be used without trouble for defining the vinylidene-fluoride-resin porous membrane of the present invention.

(Water Permeability)

A sample hollow-fiber porous membrane having a test length L (as shown in FIG. 1)=200 mm was immersed in ethanol for 15 min., then immersed in water to be hydrophilized, and then subjected to a measurement of water permeation rate per day ($m^3$/day) at a water temperature of 25° C. and a pressure difference of 100 kPa, which was then divided by a membrane area of the hollow-fiber porous membrane ($m^2$) (=Outer diameter×π×test length L) to provide a water permeation rate. The resultant value is indicated, e.g., as F (100 kPa, L=200 mm), in the unit of m/day (=$m^3/m^2$·day).

(Critical Filtration Flux According to the MBR Process)

Figure 2:
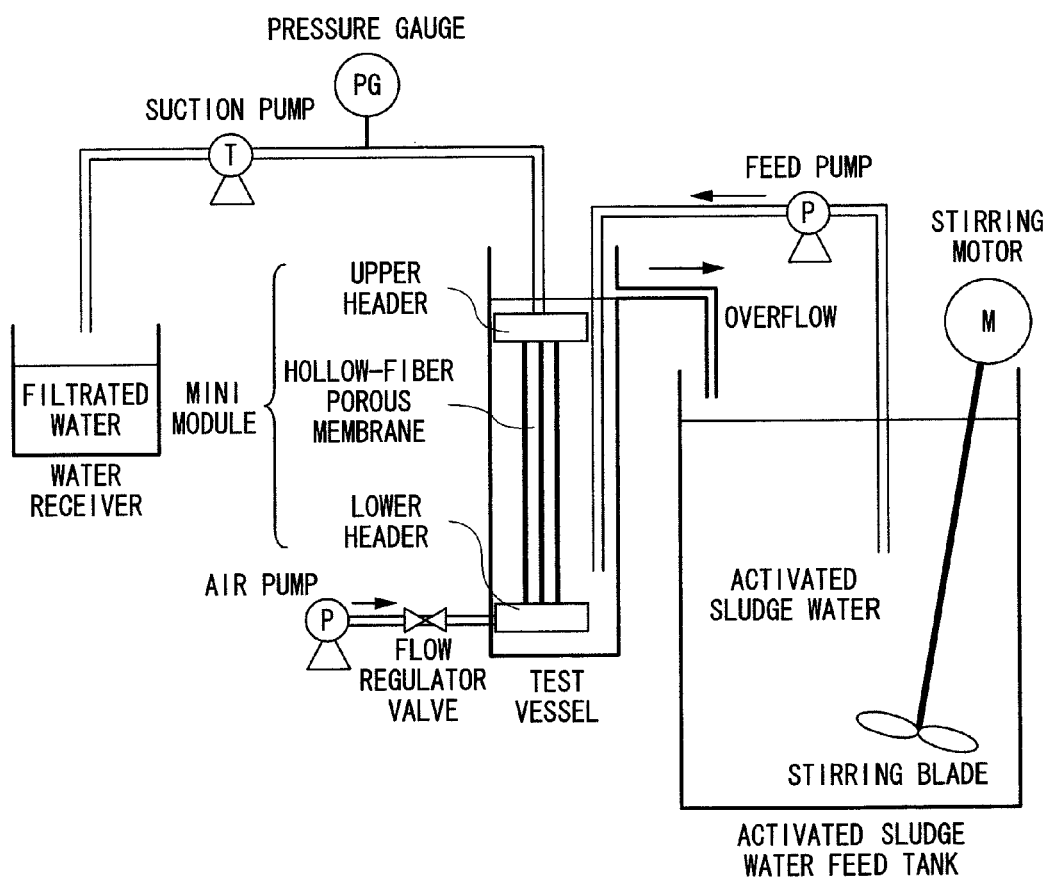
FIG. 2 is a schematic illustration of an apparatus for evaluating critical filtration flux by the MBR process of hollow-fiber porous membranes obtained in Examples and Comparative Examples.

In a test apparatus as shown in FIG. 2, an immersion-type mini-module formed from a hollow-fiber porous-membrane sample is subjected to continuous filtration of activated sludge water while increasing the filtration fluxes (m/day) every 2 hours, to measure an average differential pressure increase rate for each filtration flux. A maximum filtration flux at which the differential pressure increase rate does not exceed 0.133 kPa/2 hours is defined as critical filtration flux (m/day).

The mini module is formed by fixing two hollow-fiber porous-membrane samples vertically so as to provide an effective filtration length per fiber of 500 mm between an upper header and a lower header. The upper header is equipped with upper insertion slots for fixing open upper ends of hollow-fiber membranes at a lower part thereof, an internal space (flow path) for filtrated water communicative with the upper insertion slots, and a filtrated water exit for discharging the filtrated water at an upper part thereof. The lower header has lower insertion slots for fixing closed lower ends of the hollow-fiber membranes at an upper part thereof, 10 aeration nozzles of 1 mm in diameter not communicative with the lower insertion slots, an internal space (supply path) for supplying air to the aeration nozzles, and an air supply port for supplying air to the internal space. The upper and lower ends of the two hollow-fiber membrane samples are inserted into the upper slots and lower slots, respectively, and fixed liquid-tight with the upper header and in a closed state with the lower header, respectively with an epoxy resin.

The module-forming hollow-fiber membrane samples are immersed in ethanol for 15 minutes and rinsed with water to be wetted, and then immersed vertically at an almost central part within a rectangular test water vessel measuring a bottom area of about 30 $cm^2$ and retaining a water level of 600 mm. On the other hand, to the test water vessel, an activated sludge water or slurry containing MLSS (mixed liquor suspended solids) of 8600 mg/L and a dissolved organic content DOC (measured as a TOC (total organic content) after filtration with 1-μm glass filter) of 7-9 mg/L accommodated in a feed water tank with an internal volume of 20 L, is supplied at a rate of 0.2 L/with a pump, and an overflow is circulated back to the feed water tank. Further, from the lower header, air is supplied at a rate of 5 L/min. to cause continual bubbling in the activated sludge water in the test vessel.

In this state, a suction pump is operated to suck from the filtration water exit of the upper header to effect a cycle including 13 minute of a suction filtration operation for 13 minutes from the exterior to the inside of the hollow-fiber membranes at a fixed filtration water rate and 2 minute of a pause period, thereby measuring changes in pressure difference between the outside and the inside of the hollow-fiber membranes. The filtration test is continued at a fixed filtration water rate, which is initially set at 0.3 m/day as filtration flux (m/day) and is thereafter increased every 2 hours by an increment of 0.1 m/day, until the difference pressure increase rate exceeds 0.133 kPa/2 hours. If the difference pressure increase rate exceeds 0.133 kPa/2 hours in a cycle, a water permeation rate (that is lower by 0.1 m/day than that in the cycle) is recorded as a critical filtration flux (m/day).

(Surface Tension Measurement)

A surface tension of a wetting promoter liquid was measured by using a Du Nouy surface tension meter by the ring method according to JIS-K3362.

(Tensile Test)

A tensile tester ("RTM-100", made by Toyo Baldwin K.K.) was used for measurement in the atmosphere of a temperature of 23° C. and 50% of relative humidity, under the conditions including an initial sample length of 100 mm and a crosshead speed of 200 mm/min.

Example 1

A matrix vinylidene fluoride resin (PVDF-I) (powder) having a weight-average molecular weight (Mw) of $4.1 \times 10^5$ and a crystallinity modifier vinylidene fluoride resin (PVDF-II) (powder) having Mw=$9.7 \times 10^5$ were blended in proportions of 75 wt. % and 25 wt. %, respectively, by a Henschel mixer to obtain a PVDF mixture having Mw=$5.4 \times 10^5$ (Mixture A, crystallization temperature after being formed into a membrane=150.4° C.).

As a plasticizer, an adipic acid-based polyester plasticizer (polyester of adipic acid and 1,2-butanediol having a terminal capped with isononyl alcohol, "D623N" made by J-PLUS Co. Ltd.; number-average molecular weight=about 1800), a viscosity at 25° C. of 3000 mPa-s as measured by a cone-plate rotational viscometer according to JIS K7117-2) and a monomeric ester plasticizer ("DINA" made by J-PLUS Co. Ltd.) were mixed in a ratio of 88 wt. %/12 wt. % under stirring at room temperature to obtain a plasticizer mixture (Mixture B).

An equi-directional rotation and engagement-type twin-screw extruder ("TEM-26SS", made by Toshiba Kikai K.K.; screw diameter: 26 mm, L/D=60) was used, and Mixture A was supplied from a powder supply port to be melt-kneaded at a barrel temperature of 220° C., Mixture B was supplied at a Mixture A/Mixture B ratio of 27.9 wt. %/72.1 wt. % from a liquid supply port downstream of the powder supply port to melt-kneaded at a barrel temperature of 220° C., and the melt-kneaded product was extruded through a nozzle (at 190° C.) having an annular slit of 6 mm in outer diameter and 4 mm in inner diameter into a hollow fiber-form extrudate. In this instance, air was injected into a hollow part of the fiber through an air supply port provided at a center of the nozzle so as to adjust an inner diameter of the extrudate.

The extruded mixture in a molten state was introduced into a cooling bath of water maintained at 50° C. and having a surface 280 mm distant from the nozzle (i.e., an air gap of 280 mm, Tq=50° C.) to be cooled and solidified (at a residence time in the cooling bath of about 6 sec.), pulled up at a take-up speed of 5.0 m/min. and wound up about a bobbin to obtain a first intermediate form.

Then, the first intermediate form was immersed in dichloromethane at room temperature for 30 min. to extract the plasticizer, while rotating the bobbin so as to impregnate the fiber evenly with dichloromethane. Then, the extraction was repeated under the same condition by replacing the dichloromethane with a fresh one to effect totally 4 times of extraction.

Next, the first intermediate form was heat-treated in an oven at a temperature of 120° C. for 1 hour to remove the dichloromethane and obtain a second intermediate form, while allowing the bobbin to contract freely in diameter so as to relax the contraction stress on the fiber.

Next, the second intermediate form wound about the bobbin was immersed in an emulsified aqueous solution (surface tension=32.4 mN/m) obtained by dissolving polyglycerin fatty acid ester ("SY Glister ML-310" made by Sakamoto Yakuhin Kogyo Co., Ltd.; HLB=10.3), as a surfactant, at a concentration of 0.05 wt. % in pure water where, for 30 minutes at room temperature.

Then, while the bobbin was still immersed in the emulsified aqueous solution and rotated, the second intermediate form was longitudinally stretched at a ratio of 1.75 times by passing it on a first roller at a speed of 20.0 m/min., through a water bath at 60° C. and on a second roller at a speed of 35.0 m/min. Then, the intermediate form was caused to pass through a bath of warm water controlled at 90° C. and through a dry heating bath controlled at a spatial temperature of 140° C. to effect a heat treatment, and then taken up to provide a polyvinylidene fluoride-based hollow-fiber porous membrane (a third form) according to the process of the present invention. It took about 200 minutes until completing the stretching of the second intermediate form wound about the bobbin was completed.

Example 2

A hollow-fiber porous membrane was prepared in the same manner as in Example 1 except that the mixing ratio of PVDF-I and PVDF-II was changed to 95 wt. % and 5 wt. %, respectively, to obtain PVDF-mixture A (crystallization temperature Tc=148.8° C.), the Mixture A/Mixture B ratio was changed to 33.9 wt. %/66.1 wt. %, the cooling water bath temperature Tq was changed to 12° C., and the take-up speed was changed to 3.3 m/min.

Example 3

A hollow-fiber porous membrane was prepared in the same manner as in Example 2 except that the mixing ratio of the adipic acid-based polyester plasticizer "D623N" and the diisononyl adipate "DINA" was changed into 80 wt. % and 20 wt. %, respectively, to obtain Plasticizer-mixture B, the cooling water bath temperature Tq was changed to 85° C., and the take-up speed was changed to 4.3 m/min.

Example 4

A hollow-fiber porous membrane was prepared in the same manner as in Example 1 except that polyvinylidene fluoride of Mw=4.9×10$^5$ was used as PVDF-I to obtain PVDF-mixture A (crystallization temperature Tc=149.3° C.), the cooling water bath temperature Tq after the melt-extrusion was changed to 30° C., and the take-up speed was changed to 3.8-m/min.

Example 5

A hollow-fiber porous membrane was prepared in the same manner as in Example 4 except that the cooling water bath temperature Tq after the melt-extrusion was changed to 50° C.

Example 6

A hollow-fiber porous membrane was prepared in the same manner as in Example 4 except that the adipic acid-based polyester plasticizer was changed to a polyester of adipic acid and 1,4-butanediol having a terminal capped with octyl alcohol ("D645" made by J-PLUS Co. Ltd.; number-average molecular weight=about 2200), a viscosity at 25° C. of 5000 mPa-s as measured by a cone-plate rotational viscometer according to JIS K7117-2), the polyester plasticizer/monomeric ester plasticizer ratio was changed to 70 wt. %/30 wt. %, and the cooling water bath temperature Tq was changed to 12° C.

Example 7

A hollow-fiber porous membrane was prepared in the same manner as in Example 4 except that the cooling water bath temperature Tq after the melt-extrusion was changed to 70° C., the take-up speed was changed to 3.3 m/min., the first-stage relaxation rate was changed to 8%, and the second-stage relaxation rate was changed to 2%.

Example 8

A hollow-fiber porous membrane was prepared in the same manner as in Example 7 except that the cooling water bath temperature Tq after the melt-extrusion was changed to 85° C.

Comparative Example 1

A hollow-fiber porous membrane was prepared in the same manner as in Example 1 except that the mixing ratio of PVDF-I and PVDF-II was changed to 95 wt. % and 5 wt. %, respectively, to obtain PVDF-mixture A; Mixture B was changed to a mixture of an adipic acid-based polyester plasticizer (a polyester of adipic acid octyl alcohol and 1,2-propylene glycol having a terminal capped with octyl alcohol, "PN150" made by K.K. ADEKA; number-average molecular weight=about 1000, viscosity=500 mPa-s) and N-methyl-pyrrolidone (NMP) at a ratio of 82.5 wt. %/17.5 wt. %, mixed by stirring at room temperature; Mixture A and Mixture B were supplied at a ratio of 38.4 wt. %/61.6 wt. %; the cooling water bath temperature was changed to 40° C.; the stretching ratio was changed to 1.85 times; and the heat treatment after stretching was changed to relaxation of 8% in a water bath at 90° C. and then relaxation of 3% in air at 140° C.

Comparative Example 2

A hollow-fiber porous membrane was prepared in the same manner as in Comparative Example 1 except that the adipic acid-based polyester plasticizer was changed to a polyester of adipic acid and 1,2-butanediol having a terminal capped with isononyl alcohol ("D620N" made by J-PLUS Co. Ltd.; number-average molecular weight=about 800), a viscosity at 25° C. of 200 mPa-s as measured by a cone-plate rotational viscometer according to JIS K7117-2), and the stretching ratio was changed to 1.75 times.

Comparative Example 3

A polyvinylidene fluoride hollow-fiber porous membrane was prepared substantially according to the process of Patent document 9.

More specifically, Mixture B was formed as a mixture of an adipic acid-based polyester plasticizer (a polyester of adipic acid octyl alcohol and 1,2-propylene glycol having a terminal capped with octyl alcohol, "PN150" made by K.K. ADEKA; number-average molecular weight=about 1000) and solvent N-methyl-pyrrolidone (NMP) at a ratio of 68.6 wt. %/31.4 wt. %.

An equi-directional rotation and engagement-type twin-screw extruder ("BT-30", made by Plastic Kogaku Kenkyusyo K.K.; screw diameter: 30 mm, L/D=48) was used, and Mixture A identical to the one used in Example 1 above was supplied from a powder supply port at a position of 80 mm from the upstream end of the cylinder and Mixture B heated to 160° C. was supplied from a liquid supply port at a position of 480 mm from the upstream end of the cylinder at a Mixture A/Mixture B ratio=30.8/69.2 (by weight), followed by kneading at a barrel temperature of 220° C. to extrude the melt-kneaded product through a nozzle (at 150° C.) having an annular slit of 6 mm in outer diameter and 4 mm in inner diameter into a hollow fiber-form extrudate. In this instance, air was injected into a hollow part of the fiber through an air supply port provided at a center of the nozzle so as to so as to adjust an inner diameter of the extrudate.

Thereafter, the melt-kneaded extrudate was cooled at a cooling water bath temperature of 15° C., subjected to extraction and stretching at a ratio of 1.1 times and then passed through a bath of warm water controlled at 90° C. and through a dry heating bath controlled at a spatial temperature of 140° C. to obtain a polyvinylidene fluoride-based hollow-fiber porous membrane.

Comparative Example 4

A polyvinylidene fluoride hollow-fiber porous membrane was prepared substantially according to the process of Patent document 10.

More specifically, Mixture A was provided as a mixture of PVDF-I and PVDF-II of Example 1 in a ratio of 95 wt. % and 5 wt. %, respectively. Mixture B was identical to the one used in Comparative Example 2, i.e., a mixture of the adipic acid-based polyester ("D620N") and N-methyl-pyrrolidone (NMP) in a ratio of 82.5 wt. % and 17.5 wt. %.

An equi-directional rotation and engagement-type twin-screw extruder ("BT-30", made by Plastic Kogaku Kenkyusyo K.K.; screw diameter: 30 mm, L/D=48) was used, and Mixture A was supplied from a powder supply port at a position of 80 mm from the upstream end of the cylinder and Mixture B heated to 160° C. was supplied from a liquid supply port at a position of 480 mm from the upstream end of the cylinder at a Mixture A/Mixture B ratio=38.4/61.6 (by weight), followed by kneading at a barrel temperature of 220° C. to extrude the melt-kneaded product through a nozzle (at 150° C.) having an annular slit of 7 mm in outer diameter and 5 mm in inner diameter into a hollow fiber-form extrudate. In this instance, air was injected into a hollow part of the fiber through an air supply port provided at a center of the nozzle so as to so as to adjust an inner diameter of the extrudate.

Thereafter, the melt-kneaded extrudate was cooled at a cooling water bath temperature of 70° C., subjected to extraction of Mixture B with dichloromethane, 1 hour of drying at 50° C., stretching at 2.4 times, relaxation of 11% in a warm water bath at 90° C. and relaxation of 1% in a dry heating bath controlled at a spatial temperature of 140° C. to obtain a polyvinylidene fluoride-based hollow-fiber porous membrane.

Comparative Example 5

Mixture B was provided as a plasticizer mixture of an adipic acid-based polyester plasticizer ("D623N" made by J-PLUS Co. Ltd.; number-average molecular weight=about 1800, a viscosity at 25° C. of 3000 mPa-s as measured by a cone-plate rotational viscometer according to JIS K7117-2) and a monomeric ester plasticizer ("DINA" made by J-PLUS Co. Ltd.) were mixed in a ratio of 75 wt. %/25 wt. %. Then, the extrusion was performed in the same manner as in Example 2 except for using the above-prepared plasticizer mixture. However, the resultant mixture of PVDF and the plasticizer was non-uniform and the film formation was failed.

Comparative Example 6

Physical property measurement was performed with respect to a commercially available hollow-fiber porous membrane of vinylidene fluoride resin ("MICROSA USV-3003", made by Asahi Chemical Co., Ltd.) assumed to have been manufactured by the process of Patent document 3. The surface of the hollow-fiber porous-membrane exhibited a silicon content of 1.3 wt. % (2.8 wt. % as $SiO_2$) according to XPS (X-ray photoelectron spectroscopy). Such content of silicon is not substantially observed in the hollow-fiber porous membrane of the present invention.

Comparative Example 7

A hollow-fiber porous membrane was prepared in the same manner as in Example 4 except that the stretching was performed without performing the application of an emulsified aqueous solution of polyglycerin fatty acid ester in advance of the stretching.

The production conditions and the physical properties of the resultant hollow-fiber porous membranes of the above-described Examples and Comparative Examples, are inclusively shown in the following Tables 1 and 2, respectively.

TABLE 1

| | Item | Unit | Example 1 | Example 2 | Example 3 | Example 4 | Example 5 | Example 6 | Example 7 | Example 8 |
|---|---|---|---|---|---|---|---|---|---|---|
| Mixture A | Mw of matrix PVDF(I) × $10^5$ | | 4.1 | 4.1 | 4.1 | 4.9 | 4.9 | 4.9 | 4.9 | 4.9 |
| | Mw of crystallinity modifier PVDF(II) × $10^5$ | | 9.7 | 9.7 | 9.7 | 9.7 | 9.7 | 9.7 | 9.7 | 9.7 |
| | The mixing ratio of PVDF(I) in the mixture A | Wt. % | 75 | 95 | 95 | 75 | 75 | 75 | 75 | 75 |
| | Content of PVDF(II) in Mixture A | Wt. % | 25 | 5 | 5 | 25 | 25 | 25 | 25 | 25 |
| | Mw of Mixture A × $10^5$ | | 5.4 | 4.4 | 4.4 | 6.1 | 6.1 | 6.1 | 6.1 | 6.1 |
| Mixture B | Polyester plasticizer species | | D623N | D623N | D623N | D623N | D623N | D645 | D623N | D623N |
| | Polyester plasticizer molecular weight | | About 1800 | About 1800 | About 1800 | About 1800 | About 1800 | About 2200 | About 1800 | About 1800 |
| | Monomeric ester plasticizer species | | DINA | DINA | DINA | DINA | DINA | DINA | DINA | DINA |
| | Solvent species | | | | | | | | | |
| | Content of polyester plasticizer in Mixture B | Wt. % | 88 | 88 | 80 | 88 | 88 | 70 | 88 | 88 |
| | Content of monomeric ester plasticizer in Mixture B | Wt. % | 12 | 12 | 20 | 12 | 12 | 30 | 12 | 12 |
| | Content of solvent in Mixture B | Wt. % | | | | | | | | |
| Extrusion supply | Supply ratio of Mixture A: RA | Wt. % | 27.9 | 33.9 | 33.9 | 27.9 | 27.9 | 27.9 | 27.9 | 27.9 |
| | Supply ratio of Mixture B: RB | Wt. % | 72.1 | 66.1 | 66.1 | 72.1 | 72.1 | 72.1 | 72.1 | 72.1 |
| Oerall composition | PVDF | Wt. % | 27.9 | 33.9 | 33.9 | 27.9 | 27.9 | 27.9 | 27.9 | 27.9 |
| | Polyester plasticizer | Wt. % | 63.4 | 58.2 | 52.9 | 63.4 | 63.4 | 50.5 | 63.4 | 63.4 |
| | Monomeric ester plasticizer | Wt. % | 8.7 | 7.9 | 13.2 | 8.7 | 8.7 | 21.6 | 8.7 | 8.7 |
| | Solvent | Wt. % | 0.0 | 0.0 | 0.0 | 0.0 | 0.0 | 0.0 | 0.0 | 0.0 |
| | Crystallization temperature Tc' of a composition | °C. | 147.2 | 145.3 | 147.2 | 146.3 | 145.9 | 147.9 | 146.3 | 146.3 |
| Production conditions | Water bath temperature Tq | °C. | 50 | 12 | 85 | 30 | 50 | 12 | 70 | 85 |
| | Tc'−Tq | °C. | 97.2 | 133.3 | 62.2 | 116.3 | 95.9 | 135.9 | 76.3 | 61.3 |
| | Take-up speed | m/min | 5 | 3.3 | 4.3 | 3.8 | 3.8 | 3.8 | 3.3 | 3.3 |
| | Whole layer porosity A0 before stretching | % | 71 | 69 | 69 | 70 | 71 | 71 | 70 | 70 |
| | Stretching temperature | °C. | 60 | 60 | 60 | 60 | 60 | 60 | 60 | 60 |
| | Stretching ratio | Twice | 1.75 | 1.75 | 1.75 | 1.75 | 1.75 | 1.75 | 1.75 | 1.75 |
| | First stage relaxation | | 90° C. wet | 90° C. wet | 90° C. wet | 90° C. wet | 90° C.wet | 90° C. wet | 90° C. wet | 90° C. wet |
| | First stage relaxation rate | % | 0 | 0 | 0 | 0 | 0 | 8 | 8 | 8 |
| | Second stage relaxation | | 80° C. dry | 80° C. dry | 80° C. dry | 80° C. dry | 80° C. dry | 140° C. dry | 140° C. dry | 140° C. dry |
| | Second stager relaxation rate | % | 0 | 0 | 0 | 0 | 0 | 3 | 2 | 2 |
| Physical properties | Outer diameter | mm | 1.52 | 1.60 | 1.59 | 1.49 | 1.54 | 1.45 | 1.52 | 1.55 |
| | Inner diameter | mm | 0.98 | 1.05 | 1.04 | 0.99 | 1.02 | 0.95 | 1.02 | 1.00 |
| | Film thickness | mm | 0.27 | 0.28 | 0.27 | 0.25 | 0.26 | 0.25 | 0.26 | 0.28 |
| | Dense layer thickness | μm | 45 | 42 | 270 | 50 | 45 | 54 | 55 | 60 |
| | Dense layer porosity A1 | % | 53 | 56 | 60 | 52 | 58 | 50 | 53 | 57 |
| | Dense layer porosity A1 (5 μm) | % | 76 | | | | | | 58 | 68 |
| | Whole laver porosity A2 | % | 81 | 79 | 80 | 81 | 81 | 77 | 80 | 82 |
| | Surface pore size P1 (Side of water-to-be-treated) | μm | 0.15 | 0.13 | 0.28 | 0.11 | 0.13 | 0.11 | 0.17 | 0.23 |
| | Surface pore size P2 (permeated water side) | μm | 0.29 | 0.30 | 0.30 | 0.32 | 0.40 | 0.32 | 0.36 | 0.40 |
| | A1/A2 | | 0.65 | 0.70 | 0.75 | 0.64 | 0.71 | 0.65 | 0.66 | 0.70 |
| | A1/P1 | | 366.6 | 428.2 | 216.6 | 459.5 | 436.7 | 476.2 | 311.8 | 245.7 |
| | P2/P1 | | 2.0 | 2.3 | 1.1 | 2.8 | 3.0 | 3.0 | 2.1 | 1.7 |
| | Average pore size Pm (Half-dry-method) | μm | 0.08 | 0.07 | 0.15 | 0.09 | 0.10 | <0.07 | 0.16 | 0.24 |
| | Maximum pore size Pmax (Bubble-point-method) | μm | 0.22 | 0.15 | 0.33 | 0.14 | 0.20 | 0.12 | 0.29 | 0.39 |
| | Pure water permeability (100 kPa, 25° C., L = 200 mm) | m3/m2/day | 21.2 | 13.0 | 34.7 | 15.3 | 19.2 | 8.6 | 39.5 | 61.1 |
| | Critical filtration flux CF | m3/m2/day | 0.8 | 1.0 | 0.8 | 1.0 | 1.0 | 1.0 | 0.9 | 0.8 |
| | Tensile strength. | MPa | 7.6 | 9.7 | 7.9 | 8.9 | 7.8 | 8.9 | 7.8 | 6.6 |
| | Elongation at break | % | 196 | 186 | 105 | 198 | 179 | 197 | 139 | 95 |
| | Tc | °C. | 150.4 | 148.8 | 148.8 | 149.5 | 149.5 | 149.5 | 149.3 | 148.9 |

TABLE 1-continued

| Item | Unit | Example 1 | Example 2 | Example 3 | Example 4 | Example 5 | Example 6 | Example 7 | Example 8 |
|---|---|---|---|---|---|---|---|---|---|
| Tc-Tc' | °C. | 3.2 | 3.5 | 1.6 | 3.2 | 3.6 | 1.6 | 2.6 | 2.3 |
| Pore formation efficiency | | 1.0 | 1.0 | 1.0 | 1.0 | 1.0 | 1.0 | 1.0 | 1.0 |
| Tm2 | °C. | 174.3 | | | | | | 173.8 | 173.8 |

TABLE 2

| | Item | Unit | Comp. Ex. 1 | Comp. Ex. 2 | Comp. Ex. 3 | Comp. Ex. 4 | Comp. Ex. 5 | Comp. Ex. 6 | Comp. Ex. 7* |
|---|---|---|---|---|---|---|---|---|---|
| Mixture A | Mw of matrix PVDF(I) × $10^5$ | | 4.1 | 4.1 | 4.1 | 4.1 | 4.1 | | 4.9 |
| | Mw of crystallinity modifier PVDF(II) × $10^5$ | | 9.7 | 9.7 | 9.7 | 9.7 | 9.7 | | 9.7 |
| | Content of PVDF(I) in Mixture A | Wt. % | 95 | 95 | 75 | 95 | 95 | | 75 |
| | Content of PVDF(II) in Mixture A | Wt. % | 5 | 5 | 25 | 5 | 5 | | 25 |
| | Mw of Mixture A × $10^5$ | | 4.4 | 4.4 | 5.4 | 4.4 | 4.4 | | 6.1 |
| Mixture B | Polyester plasticizer species | | PN-150 | D620N | PN-150 | D620N | D623N | | D623N |
| | Polyester plasticizer molecular weight | | About 1000 | About 800 | About 1000 | About 800 | About 1800 | | About 1800 |
| | Monomeric ester plasticizer species | | | | | | DINA | | DINA |
| | Solvent species | | NMP | NMP | NMP | NMP | | | |
| | Content of polyester plasticizer in Mixture B | Wt. % | 82.5 | 82.5 | 68.6 | 82.5 | 75 | | 88 |
| | Content of monomeric ester plasticizer in Mixture B | Wt. % | | | | | 25 | | 12 |
| | Content of solvent in Mixture B | Wt. % | 17.5 | 17.5 | 31.4 | 17.5 | | | |
| Extrusion supply | Supply ratio of Mixture A: RA | Wt. % | 38.4 | 38.4 | 30.8 | 38.4 | 33.9 | | 27.9 |
| | Supply ratio of Mixture B: RB | Wt. % | 61.6 | 61.6 | 69.2 | 61.6 | 66.1 | | 72.1 |
| Overall composition | PVDF | Wt. % | 38.4 | 38.4 | 30.8 | 38.4 | 33.9 | | 27.9 |
| | Polyester plasticizer | Wt. % | 50.8 | 50.8 | 47.5 | 50.8 | 49.6 | | 63.4 |
| | Monomeric ester plasticizer | Wt. % | 0.0 | 0.0 | 0.0 | 0.0 | 16.5 | | 8.7 |
| | Solvent | Wt. % | 10.8 | 10.8 | 21.7 | 10.8 | 0.0 | | 0 |
| | Crystallization temperature Tc' of a composition | °C. | 138.7 | 138.7 | 134.3 | 138.3 | | | 146.3 |
| Production conditions | Water bath temperature Tq | °C. | 40 | 50 | 15 | 70 | | | 30 |
| | Tc'-Tq | °C. | 88.7 | 88.7 | 119.3 | 68.3 | | | 116.3 |
| | Take-up speed | m/min | 9.2 | 9.2 | 4.8 | 4.3 | | | 3.8 |
| | Whole layer porosity A0 before stretching | % | 63.7 | 63.7 | 56.1 | 66.0 | | | 70 |
| | Stretching temperature | °C. | 60 | 60 | 60 | 85 | | | 60 |
| | Stretching ratio | Twice | 1.85 | 1.75 | 1.1 | 2.4 | | | 1.75 |
| | First stage relaxation | | 90° C. wet | 90° C. wet | 90° C. wet | 90° C. wet | | | 90° C. wet |
| | First stage relaxation rate | % | 8 | 8 | 0 | 11 | | | 0 |
| | Second stage relaxation | | 140° C. dry | 140° C. dry | 140° C. dry | 140° C. dry | | | 80° C. dry |
| | Second stage relaxation rate | % | 3 | 3 | 0 | 1 | | | 0 |
| Physical properties | Outer diameter | mm | 1.37 | 1.36 | 1.37 | 1.37 | | 1.31 | 1.49 |
| | Inner diameter | mm | 0.87 | 0.85 | 0.88 | 0.84 | | 0.67 | 1.01 |
| | Film thickness | mm | 0.25 | 0.26 | 0.25 | 0.26 | | 0.32 | 0.26 |
| | Dense layer thickness | μm | 9 | 9 | <3 | Discontinuous | | 320 | 87 |
| | Dense layer porosity A1 | % | 39 | 44 | 24 | 52 | | 48 | 27 |
| | Dense layer porosity A1 (5 μm) | % | 41 | | 38 | 63 | | | |
| | Whole layer porosity A2 | % | 72 | 72 | 57 | 79 | | 71 | 77 |
| | Surface pore size P1 (Side of water-to-be-treated) | μm | 0.14 | 0.21 | 0.09 | 0.41 | | 0.14 | 0.12 |
| | Surface pore size P2 (permeated water side) | μm | 0.47 | 0.63 | 0.29 | 1.07 | | 0.14 | 0.27 |
| | A1/A2 | | 0.55 | 0.61 | 0.42 | 0.66 | | 0.68 | 0.35 |
| | A1/P1 | | 278.6 | 209.5 | 262.9 | 126.8 | | 342.9 | 225 |
| | P2/P1 | | 3.4 | 3.0 | 3.2 | 2.6 | | 1.0 | 2.3 |
| | Half-dry-method average pore size Pm | μm | 0.10 | 0.09 | 0.05 | 0.19 | | 0.08 | 0.1 |

TABLE 2-continued

| Item | Unit | Comp. Ex. 1 | Comp. Ex. 2 | Comp. Ex. 3 | Comp. Ex. 4 | Comp. Ex. 5 | Comp. Ex. 6 | Comp. Ex. 7* |
|---|---|---|---|---|---|---|---|---|
| Bubble-point-method maximum pore size Pmax | μm | 0.20 | 0.19 | 0.09 | 0.36 | | 0.20 | 0.17 |
| Pure water permeabikity (100 kPa, 25° C., L = 200 mm) | m3/m2/day | 32.0 | 33.2 | 13.5 | 127.0 | | 25.0 | 16.6 |
| Critical filtration flux CF | m3/m2/day | 0.4 | 0.4 | 0.3 | 0.7 | | 0.6 | 0.4 |
| Tensile strength. | MPa | 10.5 | 10.1 | 8.0 | 9.6 | | 5.7 | 9.2 |
| It pulls and is a degree of breaking extension. | % | 96 | 61 | 21 | 11 | | 99 | 191 |
| Tc | ° C. | 146.7 | 146.7 | 148.1 | 142.4 | | | 149.5 |
| Tc-Tc' | ° C. | 8.0 | 8.0 | 13.8 | 4.1 | | | 2.9 |
| Pore formation efficiency A0/RB | | 1.0 | 1.0 | 0.8 | 1.1 | | | 1.0 |
| Tm2 | ° C. | 174.1 | | 174.4 | 173.7 | | | |

*No wetting before stretching.

INDUSTRIAL APPLICABILITY

As can be understood from the above Tables 1 and 2, there are provided a porous membrane of vinylidene fluoride resin which has a surface pore size, a water permeation rate and mechanical strength, particularly suitable for separation and particularly for water (filtration) treatment, and also shows good water-permeation-rate maintenance performance, even when applied to continuous filtration of cloudy water, and also a process for production thereof. Although the vinylidene-fluoride-resin porous membrane of the present invention is suitable for water (filtration) treatment as mentioned above, it also has characteristics that the pore sizes are continually expanded in the direction of the membrane thickness and the porosity is uniformly distributed in the direction of the membrane thickness. Particularly, owing to the improvement in porosity of the dense layer which contributes to separation characteristic and selective permeation characteristic, the membrane provides little resistance to movement or permeation of fluid or ions, while having excellent separation or selective permeation characteristics. Accordingly, the porous membrane of the present invention can be suitably used not only for water (filtration) treatment but also as separation membranes for condensation of bacteria, protein, etc., and for recovery of the chemically flocculated particles of heavy metals, separation membranes for oil-water separation or gas-liquid separation, a separator membrane for lithium ion secondary batteries, a support membrane for solid electrolyte, etc.

The invention claimed is:

1. A porous membrane of vinylidene fluoride resin, having two major surfaces sandwiching a certain thickness, including a dense layer which governs filtration performance on one major surface side and a sparse layer which contributes to reinforcement on an other opposite major surface side, and having an asymmetrical gradient network texture including pore sizes which increase continuously from the one major surface to the other opposite major surface, wherein the dense layer includes a 7 μm-thick portion contiguous to the one major surface showing a porosity A1 of at least 50%, the one major surface shows a pore size of at most 0.30 μm, and the vinylidene fluoride resin shows a difference Tm2−Tc of at most 32° C. between an inherent melting point Tm2 (° C.) of the resin and a crystallization temperature Tc (° C.) according to DSC measurement.

2. The porous membrane according to claim 1, wherein the dense layer contiguous to the one major surface includes an at least 15 μm-thick layer which shows a uniform pore size according to cross-sectional observation through a scanning electron microscope.

3. The porous membrane according to claim 1, which shows a ratio A1/P1 of at least 200 between said porosity A1 (%) of the portion of the dense layer contiguous to the one major surface and the surface pore size P1 (μm) on the one major surface, and a ratio P2/P1 of 2.0-10.0 between a surface pore size P2 (μm) of the other opposite major surface-side surface and P1.

4. The porous membrane according to claim 1, which shows a ratio A1/A2 of at least 0.65 between said porosity A1 (%) of the portion of the dense layer contiguous to the one major surface and a whole layer porosity A2 (%).

5. The porous membrane according to claim 1, wherein the crystallization temperature Tc is at least 143° C.

6. The porous membrane according to claim 1, wherein said vinylidene fluoride resin is a mixture of 25-98 wt. % of a vinylidene fluoride resin (PVDF-I) having a weight-average molecular weight of 200,000-670,000 and 2-75 wt. % of vinylidene fluoride resins (PVDF-II) having a weight-average molecular weight which is at least 1.8 times that of PVDF-I and less than 1,200,000.

7. The porous membrane according to claim 1, wherein said vinylidene fluoride resin comprises a homopolymer of vinylidene fluoride as a whole.

8. The porous membrane according to claim 1, having an entire shape of a hollow-fiber including the one major surface as an outer surface and the other opposite major surface as an inner surface.

9. The porous membrane according to claim 1, showing a tensile strength of at least 7 MPa.

10. The porous membrane according to claim 1, which has been stretched.

11. A water filtration membrane, including the one major surface on its surface in contact with water to be treated and the other opposite major surface membrane on its surface in contact with permeated water of the porous membrane according to claim 1.

12. A process for producing the porous membrane according to claim 1, comprising:
melt-extruding a composition obtained by melt-kneading 20-50 wt. % of a vinylidene fluoride resin having a weight-average molecular weight of at least 300,000 and showing a difference Tm2−Tc of at most 32° C. between an inherent melting point Tm2 (° C.) of the resin and a crystallization temperature Tc (° C.) according to DSC measurement, and 50-80 wt. % of a plasticizer into a form of a film;

cooling the film preferentially from one side thereof with an inert liquid which is inert to the vinylidene fluoride resin to solidify the film; and extracting the plasticizer to recover a porous membrane having an asymmetrical gradient-network-texture;

wherein the plasticizer comprises a polyester plasticizer which is mutually soluble with the vinylidene fluoride resin at a temperature forming the melt- kneaded composition, shows a crystallization temperature Tc' (° C.) of at least 140° C. according to DSC measurement and provides the melt-kneaded composition with a crystallization temperature which is substantially identical to a crystallization temperature of the vinylidene fluoride resin alone.

13. The production process according to claim 12, wherein said plasticizer includes a mutual solubility inhibitor in addition to a polyester plasticizer having a number-average molecular weight of at least 1200.

14. The production process according to claim 13, wherein said plasticizer comprises 50-98 wt. % of the polyester plasticizers and 2-50 wt. % of a monomeric ester plasticizer as the mutual solubility inhibitor.

15. The production process according to claim 12, wherein said polyester plasticizer has a viscosity of at most 1000 mPa-s at a temperature of 25° C.

16. The production process according to claim 12, wherein said polyester plasticizer comprises a polyester of adipic acid and a glycol.

17. The production process according to claim 12, wherein said polyester plasticizer is a polyester having a molecular terminal capped with a monohydric alcohol having 9-18 carbon atoms.

18. The production process according to claim 12, wherein said vinylidene fluoride resin is a mixture of 25-98 wt. % of a matrix vinylidene fluoride resin (PVDF-I) having a weight-average molecular weight of 200,000-670,000 and 2-75 wt. % of a vinylidene fluoride resin (PVDF-II), as a crystallizability modifier, having a weight-average molecular weight which is at least 1.8 times that of PVDF-I and less than 1,200,000.

19. The production process according to claim 12, wherein said composition is melt-extruded into a form of a hollow-fiber film, which is then cooled preferentially from an outer surface side thereof with a liquid inert to the vinylidene fluoride resin to solidify the film.

20. The production process according to claim 12, wherein said composition shows a difference Tc'–Tq of at least 95° C. between the temperature Tc' and a temperature Tq (° C.) of said inert liquid used for the cooling.

* * * * *